(12) United States Patent
Tada et al.

(10) Patent No.: US 7,209,631 B2
(45) Date of Patent: *Apr. 24, 2007

(54) IMAGE RECORDING/REPRODUCING APPARATUS

(75) Inventors: Yukinobu Tada, Ebina (JP); Hideo Nishijima, Hitachinaka (JP); Kaneyuki Okamoto, Hitachinaka (JP); Masayuki Kijima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1116 days.

This patent is subject to a terminal disclaimer.

(21) Appl. No.: 09/861,663

(22) Filed: May 22, 2001

(65) Prior Publication Data

US 2001/0046368 A1 Nov. 29, 2001

Related U.S. Application Data

(63) Continuation of application No. 09/079,456, filed on May 15, 1998, which is a continuation of application No. 08/949,335, filed on Oct. 14, 1997, now Pat. No. 6,002,831, which is a continuation of application No. 08/648,815, filed on May 16, 1996, now abandoned.

(30) Foreign Application Priority Data

May 16, 1995 (JP) ................................. 07-116681

(51) Int. Cl.
H04N 5/76 (2006.01)
(52) U.S. Cl. .............................. 386/46; 386/80; 386/81; 358/908
(58) Field of Classification Search .................. 386/45, 386/46, 52, 55, 80, 81
See application file for complete search history.

(56) References Cited

U.S. PATENT DOCUMENTS

| 4,224,644 | A | * | 9/1980 | Lewis et al. | ................ 360/72.2 |
| 4,750,052 | A | * | 6/1988 | Poppy et al. | ................ 358/335 |
| 5,151,788 | A | * | 9/1992 | Blum | ......................... 358/188 |
| 5,333,091 | A | | 7/1994 | Iggulden et al. | |

(Continued)

FOREIGN PATENT DOCUMENTS

JP    58 146072    8/1983

(Continued)

*Primary Examiner*—Vincent F. Boccio
(74) *Attorney, Agent, or Firm*—Crowell & Moring LLP (57) ABSTRACT

A video recording/reproducing apparatus capable of discriminating commercial message portions even when a broadcasting mode is the same. A magnetic head records television broadcasting signals to a magnetic tape and reproduces the television broadcasting signals from this magnetic tape. When the television broadcasting signals are reduced by recording/reproducing apparatus, an audio-free portion detector detects audio-free portions from audio signals in the television broadcasting signals. Commercial message (CM) portion detector detects the commercial message portions in the television broadcasting signals by the time intervals among a plurality of audio-free portions detected by the audio-free portion detector, and a CM information memory circuit stores the information of the recording positions of the commercial message portions detected by this commercial message portion detector to the magnetic tape. When the television broadcasting signals are reproduced from the magnetic tape, reproduction is carried out while the commercial message portions are skipped, at the recording positions of the commercial message portions to the magnetic tape, on the basis of the information of the recording positions of the commercial message portions to the magnetic tape that are stored in the memory circuit.

15 Claims, 8 Drawing Sheets

U.S. PATENT DOCUMENTS

| | | |
|---|---|---|
| 5,455,630 A | 10/1995 | McFarland et al. |
| 5,488,409 A * | 1/1996 | Yuen et al. .................... 348/5 |
| 5,493,455 A * | 2/1996 | Miyoshi et al. ............... 360/60 |
| 5,543,929 A * | 8/1996 | Mankovitz et al. ......... 358/335 |
| 5,621,579 A * | 4/1997 | Yuen .......................... 386/95 |
| 5,692,093 A | 11/1997 | Iggulden et al. |
| 5,696,866 A | 12/1997 | Iggulden et al. |
| 6,002,831 A * | 12/1999 | Tada et al. ................... 386/46 |
| 6,275,646 B1 * | 8/2001 | Tada et al. ................... 386/46 |

FOREIGN PATENT DOCUMENTS

| | | |
|---|---|---|
| JP | 1-174192 (A) | 7/1989 |
| JP | 2-81344 (A) | 3/1990 |
| JP | 3-158086 | 7/1991 |
| JP | 3-184484 | 8/1991 |
| JP | 3-262287 | 11/1991 |
| JP | 63-24729 | 2/1998 |

* cited by examiner

IMAGE RECORDING/REPRODUCING APPARATUS

This application is a continuation of application of application Ser. No. 09/079,456, filed May 15, 1998, which is a continuation of Ser. No. 08/949,335, filed Oct. 14, 1997, now U.S. Pat. No. 6,002,831, which is a continuation of Ser. No. 08/648,815, filed May 16, 1996, now abandoned.

BACKGROUND OF THE INVENTION

This invention relates to a video recording/reproducing apparatus and more specifically, to a video recording/reproducing apparatus for recording and reproducing television broadcasting signals and distinguishing commercial message portions and program content portions in a broadcasting program.

A video recording/reproducing apparatus is known which distinguishes commercial message portions from program content portions from television broadcasting signals when the television broadcasting signals are recorded, and records the program content portions by omitting the commercial message portions. Video recording/reproducing apparatuses of this kind include a bilingual broadcasting mode judgement system described in JP-A-3-158086 and a stereophonic broadcasting mode judgement system described in JP-A-3-262287, for example.

Since the commercial messages are broadcasted by the stereophonic broadcasting in the system described in JP-A-3-158086, this system judges the bilingual broadcasting mode contained in audio signals of television broadcasting, distinguishes the program content portions of the bilingual broadcasting mode from the commercial message portions of the stereophonic broadcasting mode, automatically omits only the commercial message (CM) portions and records the program content portions of the bilingual broadcasting mode.

On the other hand, the system described in JP-A-3-262287 judges the stereophonic broadcasting mode contained in the audio signals of television broadcasting, distinguishes the program content portions of the stereophonic broadcasting mode from the commercial message portions of the monaural broadcasting mode, automatically omits only the commercial message portions and records the program content portions of the stereophonic broadcasting mode.

In the systems according to the prior art described above, however, automatic omission of the CM portions cannot be effected in the bilingual broadcasting mode judgement system when the program content portions are the monaural broadcasting program and the stereo-phonic broadcasting program. In the stereophonic broadcasting mode judgement system, the CM is originally based on the assumption that it is broadcasted by monaural broadcasting. Therefore, if the CM itself is broadcasted by stereophonic broadcasting, it cannot be distinguished from the stereophonic broadcasting programs.

Therefore, the conventional systems intend to distinguish two kinds of program contents from the difference of the broadcasting modes of bilingual broadcasting, monaural broadcasting and stereophonic broadcasting. For this reason, when the program content portions and the commercial message portions have the same broadcasting mode, they cannot be distinguished from one another.

Particularly recently, bilingual broadcasting and stereophonic broadcasting have been employed for the program content portions, too, not only for picture programs but also for ordinary programs such as music programs, sports programs, drama programs, and so forth. Therefore, the possibility drops that the prior art system can omit only the commercial message portions, and these systems have become of no practical use.

SUMMARY OF THE INVENTION

It is therefore an object of the present invention to provide a video recording/reproducing apparatus which can distinguish commercial message portions even in the same broadcasting mode.

In a video recording/reproducing apparatus including recording/reproducing means for recording television broadcasting signals to a recording medium and reproducing the broadcasting signals from the recording medium, the object of the present invention described above can be accomplished by a video recording/reproducing apparatus which comprises audio-free portion detection means for detecting audio-free portions from audio signals in television broadcasting signals when the television broadcasting signals are recorded by the recording/reproducing means, commercial message portion detection means for detecting commercial message portions in the television broadcasting signals by the time intervals among a plurality of the audio-free portions detected by the audio-free portion detection means, memory means for storing information of recording positions of the commercial message portions detected by the commercial message portion detection means to the recording medium, and control means for controlling reproduction from the recording medium at the time of reproduction of the television broadcasting signals from the recording medium by the recording/reproducing means, on the basis of the information of the recording positions of the commercial message portions stored in the memory means to the recording medium, so that reproduction can be carried out while the commercial message portions are skipped, at the recording positions of the commercial message portions to the recording medium.

Preferably, the video recording/reproducing apparatus described above further comprises video signal detection means for detecting changing points of video signals from the video signals in the television broadcasting signals at the time of recording of the television broadcasting signals by the recording/reproducing means, wherein the commercial message portion detection means detects the commercial message portions in the television broadcasting signals on the basis of the time intervals among a plurality of audio-free portions and the time intervals of the changing points of a plurality of video signals detected by the audio-free portion detection means and the video signal detection means, respectively.

In the video recording/reproducing apparatus described above, the commercial message portion detection means preferably detects the point at which the video signal level changes to a black level as the changing point of the video signal.

In the video recording/reproducing apparatus described above, the commercial message portion detection means preferably detects the point at which the video signal level changes to a white level as the changing point of the video signal.

In the video recording/reproducing apparatus described above, the commercial message portion detection means preferably detects the point at which the video signal level greatly changes as the changing point of the video signal.

In the video recording/reproducing apparatus described above, the memory means preferably comprises a semiconductor memory.

In the video recording/reproducing apparatus described above, the memory means preferably comprises the recording medium to which the television broadcasting signals are recorded by the recording/reproducing means.

In the video recording/reproducing apparatus described above, the information of the recording position of the commercial message portion, which is stored in the recording medium by the memory means, is preferably stored at the leading position of the recording medium.

In the video recording/reproducing apparatus described above, the information of the recording position of the commercial message portion stored to the recording medium by the memory means to the recording medium is preferably stored at the leading positions of a plurality of television signals to be recorded to the recording medium, respectively.

In the video recording/reproducing apparatus described above, the information of the recording position of the commercial message portion stored to the recording medium by the memory means is preferably stored at the leading position and the end position of the commercial message portion contained in each of a plurality of television signals recorded to the recording medium.

In the video recording/reproducing apparatus described above, the apparatus further comprises mode judgement means for detecting the commercial message portions in the television broadcasting signals at the time of recording of the television broadcasting signals by the recording/reproducing means, on the basis of the difference of broadcasting modes between program content portions of the television broadcasting signals and the commercial message portions, and wherein the commercial message portion detection means detects the commercial message portions in the television broadcasting signals on the basis of the time intervals among a plurality of audio-free portions, the time intervals of the changing points of a plurality of video signals and the difference of the broadcasting modes detected by the audio-free portion detection means, by the video signal detection means and by the mode judgement means, respectively.

In the video recording/reproducing apparatus described above, the commercial message portion detection means detects recorded portions as the commercial message portions when the time intervals so detected are substantially some multiples of N seconds.

In the video recording/reproducing apparatus described above, the commercial message portion detection means judges the recorded portions as the commercial message portions when at least two time intervals having substantially some multiples of N seconds are detected consecutively.

The video recording/reproducing apparatus of the present invention includes the audio-free portion detection means for detecting audio-free portions from audio signals of the television broadcasting signals at the time of recording of the television broadcasting signals by the recording/reproduction means, the commercial message portion detection means for detecting commercial message portions in the television broadcasting signals by the time intervals among a plurality of the audio-free portions detected by the audio-free portion detection means, the memory means for storing information of recording positions of the commercial message portions detected by the commercial message portion detection means to the recording medium, and control means for controlling reproduction from the recording medium at the time of reproduction of the television broadcasting signals from the recording medium by the recording/reproducing means, on the basis of the information of the recording positions of the commercial message portions stored in the memory means to the recording medium, so that reproduction can be carried out while the commercial message portions are skipped, at the recording positions of the commercial message portions to the recording medium. Since the commercial message portions can be reproduced skippingly by using the time intervals of the audio-free portions of the audio signals in the television signals, the commercial message portions can be discriminated and can be reproduced even when the broadcasting mode is the same.

Since the apparatus of the present invention further includes the video signal detection means for detecting the changing points of video signals from the video signals in the television broadcasting signals at the time of recording of the television broadcasting signals by the recording/reproducing means, the commercial message portion detection means detects the commercial message portions in the television broadcasting signals on the basis of the time intervals of a plurality of audio-free portions and the time intervals of the changing points of a plurality of video signals detected by the audio-free portion detection means and the video signal detection means, respectively. Therefore, the commercial message portions can be distinguished more correctly.

Further, the commercial message portion detection means can easily distinguish the changing point because it detects the point at which the video signal level changes to a black level as the changing point of the video signal.

The commercial message portion detection means can easily distinguish the changing point in the same way as the black level because it detects the point at which the video signal level changes to a white level as the changing point of the video signal.

The commercial message portion detection means can distinguish the changing points, inclusive of the fade-out portions, because it detects the point at which the video signal level greatly changes as the changing point of the video signal.

When the memory means comprises a semiconductor memory, storage can be made at the time of recording.

When the memory means comprises the recording medium to which the television broadcasting signals are recorded by the recording/reproducing means, existing recording media can be utilized and new memory means need not be used.

When the information of the recording position of the commercial message portion to be stored in the recording medium by the memory medium is stored at the leading position of the recording medium, all the information can be written once again at the time of overwrite.

Further, when the information of the recording position of the commercial message portion to be stored in the recording medium by the memory means to the recording medium is stored at the leading position of each of a plurality of commercial message portions stored in the recording medium by the memory means, the rewinding quantity of the recording medium after completion of recording can be reduced.

The information of the commercial message portion stored in the recording medium by the memory means to the recording medium is stored at the leading position and the end position of the commercial message portion contained in each of a plurality of television signals stored in the recording medium. Therefore, skip reproduction can be carried out as such from the present position at the time of reproduction.

Because the apparatus of the present invention further includes the mode judgement means for detecting the commercial message portions in the television broadcasting signals at the time of recording of the television broadcasting signals by the recording/reproducing means, on the basis of the difference of broadcasting modes between the program content portions of the television broadcasting signals and the commercial message portions, the commercial message portion detection means detects the commercial message portions in the television broadcasting signals on the basis of the time intervals of a plurality of time intervals, the time intervals of the changing points of a plurality of video signals and the difference of the broadcasting modes detected by the audio-free portion detection means, the video signal detection means and the mode judgement means, respectively. Therefore, the commercial message portions can be distinguished more correctly.

The commercial message portion detection means judges recorded portions as the commercial message portions when the time interval so detected is substantially some multiples of N seconds, and can therefore distinguish easily the commercial message portions.

The commercial message portion detection means judges recorded portions as the commercial message portions when at least two time intervals having substantially some multiples of N seconds are detected consecutively, and can therefore distinguish correctly the commercial message portions.

DESCRIPTION OF THE PREFERRED EMBODIMENTS

A first embodiment of the present invention will be explained with reference to FIG. 1.

Figure 1:
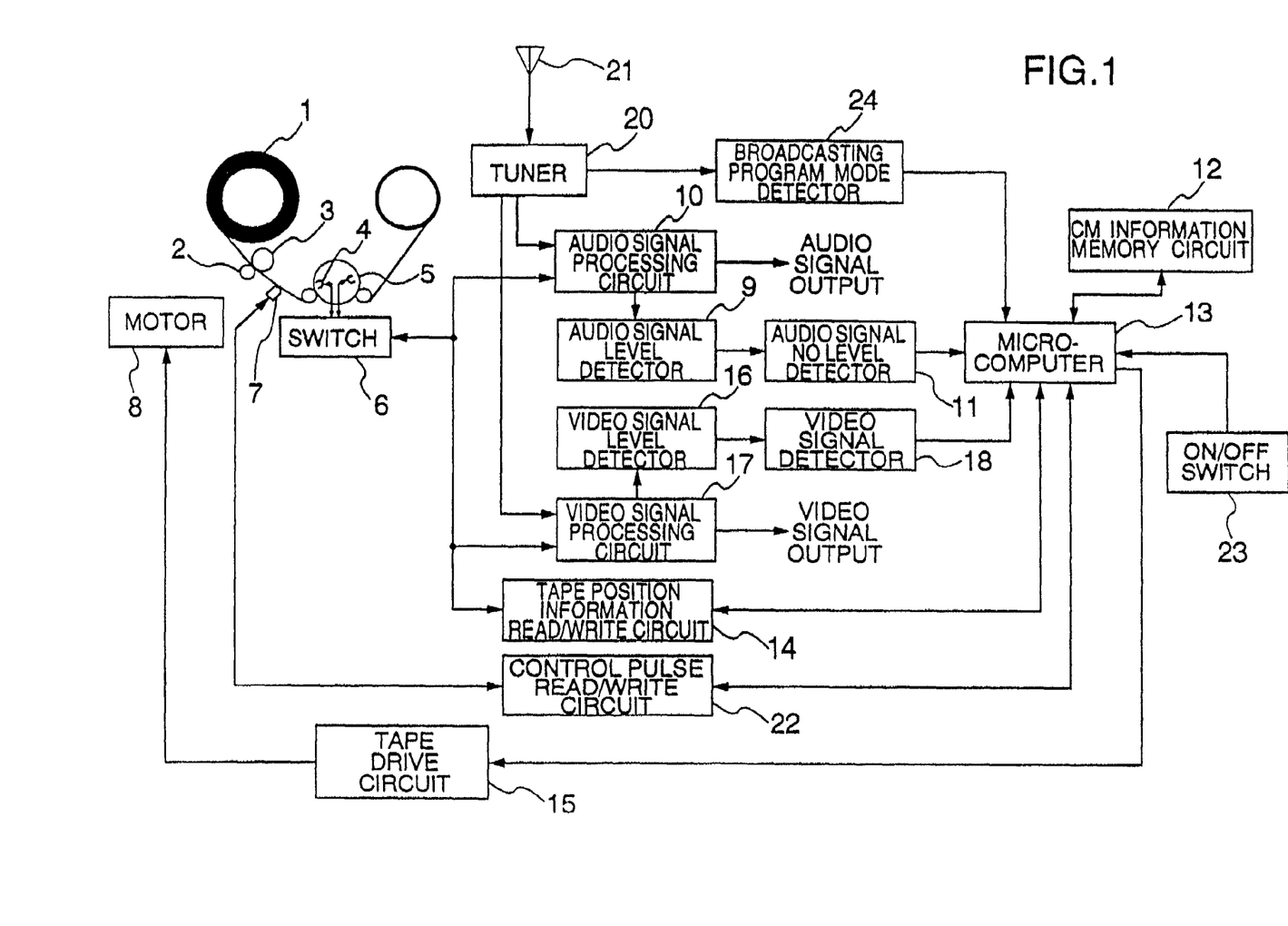
FIG. 1 is a block diagram of a video recording/reproducing apparatus according to one embodiment of the present invention.

FIG. 1 is a block diagram of a video recording/reproducing apparatus according to the first embodiment of the present invention.

A magnetic tape 1 is normally fed at a constant speed, and this speed is controlled by a capstan 2 so disposed as to oppose a pinch roller 3 while clamping the magnetic tape 1 between them.

Two magnetic heads 4 are fitted to a rotary cylinder 5 with an angular gap of 180° between them. The magnetic tape 1 is wound on this rotary cylinder 5, and television broadcasting signals are recorded or reproduced by the magnetic heads 4. These two magnetic heads 4 are switched by a magnetic head changeover switch 6 and are selectively used, so that reproduction signals which are continuous time-wise can be obtained. Here, the magnetic head changeover switch 6 switches either one of the heads 4 which is in contact with the magnetic tape 1 so that the selected head 4 can select the reproduction signals of the tape with which it keeps contact. The timing of this switching operation is generally acquired by detecting the magnetic field generated by a magnet (not shown) fitted to the rotary cylinder 5 by means of a sensor (not shown).

A magnetic tape drive motor 8 is used so as to drive the capstan 2 and to drive a take-up reel for taking up the magnetic tape 1, and the number of revolution of this motor 8 is controlled in accordance with the modes of operation such as a normal speed mode, a fast-forward mode, etc.

Control pulses used for a variety of controls are recorded on the magnetic tape 1 in addition to the ordinary television broadcasting signals, and this recording operation is carried out by using a stationary head 7 for the control pulses. The control pulses are recorded in a 1/30 second interval.

The explanation will be hereby given on the case where the television broadcasting signals in which CM (Commercial Message) exists are recorded.

The television broadcasting signals are inputted to an antenna 21 and are supplied to a tuner 20. A desired program is selected by the tuner 20. The program selected by the tuner 20 is subjected to conversion processing in an audio signal processing circuit 10 and is outputted as RF (Radio Frequency) audio signals. These RF audio signals are alternately sent to the two magnetic heads 4 and are recorded on the magnetic tape 1. These signals are subjected to conversion processing in a video signal processing circuit 17, are outputted as video signals of a base band, are sent alternately to the two magnetic heads 4 through the magnetic head changeover switch 6, and are recorded on the magnetic tape 1.

When recording is started, a tape position information read/write circuit 14 simultaneously records an identification number of the tape with a time code representing the position information of the tape, etc, on the magnetic tape 1 through the magnetic head 4. This information is encoded and written into a V blanking portion, or the like, of the video signal, for example. The identification number of the tape is the number that compulsively applies 99 titles to each magnetic tape in accordance with the command from the microcomputer 13.

On the other hand, the signal outputted as the audio signal in the audio signal processing circuit 10 is supplied to an audio signal level detector 9. This audio signal level detector 9 detects the level of the audio signal. The audio signal level detector 9 comprises a smoothing circuit, for example, smoothes a low frequency audio signal and picks up a D.C. signal.

The magnitude of the level detected by the audio signal level detector 9 is supplied to an audio signal no level detector 11. The audio signal no level detector 11 detects the point at which the audio signal level is close to zero, and the signal so detected is supplied to the microcomputer 13. The audio signal no level detector 11 comprises a comparison circuit, for example, and its reference voltage is set to 0 V or a voltage slightly greater than 0 V. The level of the inputted audio signal is compared with this reference voltage, and a level "1" is outputted when the level of the audio signal is higher than the reference voltage. Here, the level "1" can be outputted, too, by incorporating a NOT circuit in this circuit when the level of the audio signal is lower than the reference voltage.

The output of the audio signal no level detector 11 is applied to the microcomputer 13. The microcomputer 13 stores the time of the detection signal supplied this time from the audio signal no level detector 11 and representing the audio signal no level portion as well as the position information of the tape supplied from the tape position information read/write circuit 14, measures the time interval between both detection signals when the detection signal of the next time representing the audio signal no level portion is detected, and judges the information as CM (commercial message) when the interval between the detection signal of this time and the detection signal of the next time has a predetermined time interval. The position information of the tape is the information of the time codes corresponding to the absolute address (absolute time) from the leading position of the tape and to an X-minute/Y-second Z-frame. The method of judging the information as the CM will be explained later with reference to FIG. 2.

Incidentally, in the foregoing explanation, the audio signal no level detector 11 is a discrete circuit from the microcomputer 13. However, because the latest microcomputers 13 have a built-in A/D convertor having a plurality of channels, the audio signal no level portion may be detected by directly applying the signal of the audio signal level detector 9 to the microcomputer 13 to effect A/D conversion and then comparing it with the reference voltage inside the microcomputer 13.

On the other hand, the signal outputted as the video signal of the base band in the video signal processing circuit 17 is supplied to the video signal level detector 16. This video signal level detector 16 averages the points at which the video signal level fades out and changes to the black level or to the white level and the signal levels of the screen, and detects the change points such as the point at which the signal level drastically changes (switching point of scenes, etc.). The video signal level detector 16 comprises a frame integration circuit, for example. The frame integration circuit is triggered on the basis of a vertical sync signal (V-sync) in the video signal and integrates the video signals of one frame. In consequence, the mean level of the video signals of the one frame is determined, and the magnitude of the level of the video signal is detected. The magnitude of the level of the video signal detected by the video signal level detector 16 is supplied to the video signal detector 18.

The video signal detector 18 compares the mean level obtained in this way with the reference voltage of the comparison circuit. Here, when the signal subjected to frame integration is higher than the reference voltage by setting the reference voltage to a voltage slightly higher than the black level, the comparison circuit judges the level as the black level and outputs it. It is of course possible to use a NOT circuit and to output the black level from the comparison circuit when the frame-integrated signal is lower than the reference voltage.

When the reference voltage is set to a voltage slightly lower than the white level, the comparison circuit judges the level as the white level and outputs it when the frame-integrated signal is higher than the reference voltage.

The points at which the signal level drastically changes (switching point of scenes) can be detected by constituting the video signal detector 18 by a differential circuit and a comparison circuit so that the differential circuit differentiates the signal level and the comparison circuit detects whether or not the differential value is greater than the reference value.

It is customary in the United States to employ fade-out before and behind the commercial message portion and it is customary in Japan to switch the scene. However, there is the case where fade-out is employed in Japan, too, and in such a case, too, a system is employed which detects the point at which the signal level drastically changes (switching point of the scene). For, when fade-out occurs, the level of the signal changes before and behind this fade-out, and judgement can be made in the same way as in switching of the scene.

In the explanation given above, the video signals of one frame are integrated, but this one frame is not particularly necessary. In short, the change point of the scene needs be detected. Therefore, only the signals in the proximity of the center of the screen may be integrated. To integrate the video signals corresponding to the horizontal scanning lines of the 100th to 150th lines, for example, the integration circuit is triggered in such a manner as to start operating after the passage of a predetermined signal from the vertical sync signal (V-sync) on the basis of this signal, and the integration operation is conducted thereafter for a predetermined time.

Though the comparison circuit is a separate circuit from the microcomputer 13 in the foregoing explanation, it is also possible to directly apply the signal of the integration circuit to the microcomputer 13 so as to conduct A/D conversion because the latest microcomputers 13 have a built-in A/D convertor having a plurality of channels, and the change point of the video signal is thereafter detected by comparing the signal with the reference voltage or comparing the mean level between the frames inside the microcomputer 13.

The video signal detector 18 supplies the detection signal to the microcomputer 13. The microcomputer 13 measures the time interval of the detection signals from the time of the detection signal of this time supplied from the video signal detector 18 and the time of the detection signal of the next time, and judges the signal as the CM when the time interval between the detection signal of this time and the detection signal of the next time is a predetermined interval. The method of judging the CM will be explained later with reference to FIG. 2. When the detection signals by the audio signal and the video signal are outputted, the tape position information supplied from the tape position information read/write circuit 22 is simultaneously stored in the microcomputer 13.

The signals are judged as the CM by using both of the judgement of the audio signal no level portion from the features of the audio signal and the video signal and the judgement of the changing portion or the fade-out portion of the video signal, and the position information of the start of the CM and its end and the tape recognition number are supplied to the CM information memory circuit 12. The CM information memory circuit 12 stores the tape recognition number and the tape position information as the CM information. The CM information memory circuit 12 for storing this CM information may comprise a semiconductor memory such as an EEPROM or an RAM, or a magnetic tape. In other words, the position information of the CM is sequentially stored in the CM information memory circuit 12 during the recording mode while the program is being recorded.

Incidentally, while the judgement of the CM is carried out in the way described above, the audio signal and the video signal are recorded to the magnetic tape 1 through the magnetic head 4 in the same way as in ordinary video signal recording apparatuses. In this instance, all the program content portion and the commercial message portion are recorded unlike the prior art in which recording is made while the CM portion is omitted. In the reproduction mode, reproduction is effected while the commercial message portion is skipped.

Next, reproduction of the recorded program will be explained.

During the reproduction mode, the tape position information and the tape recognition number written to the magnetic tape are read out by the tape position information read/write circuit 14. The tape position information and the tape recognition number so read out are supplied to the microcomputer 13. The microcomputer 13 looks up the CM position information of the tape during reproduction, which is stored in the CM information memory circuit 12, on the basis of the tape recognition number.

The microcomputer 13 distinguishes the CM portion from the program portion from the tape position information during reproduction on the basis of the CM position information looked up from the CM information memory circuit 12, and sends a fast-forward command or a fast-play command to the tape driving circuit 15 so as to skip the CM portion when the CM portion of the tape is reached.

In the fast-forward mode, it is not possible to reproduce the video signals and the audio signals from the magnetic tape 1 and it is not clear, either, from the screen of the television receiver whether the original commercial message portion is skipped or the program content portion is skipped. In fast-play, on the other hand, the video is displayed on the screen to a certain extent, though the video is reproduced at a high reproduction speed. Therefore, the user can identify whether the commercial message portion is skipped or the program content portion is skipped. For this reason, fast-play is preferably employed for such a need.

The tape driving circuit 15 drives the motor 8 in accordance with the command given thereto, and causes the magnetic tape 1 to travel at a high speed. The microcomputer 13 calculates the number of control pulses existing from the start position of the CM to its end position from the CM information, and also counts the number of control pulses supplied from the control pulse read/write circuit 22 from the CM start position. When the number of the control pulses so counted reaches the number of the control pulses existing in the CM portion, the microcomputer 13 sends the command to the tape driving circuit 15 to stop the fast-forward or fast-play operation and to return to the normal reproduction. The tape driving circuit 15 drives the motor 8 so as to let the magnetic tape 1 travel at the standard reproduction speed. The position information cannot be read from the magnetic tape 1 during the high speed travel. Therefore, the moving distance of the tape (the time of the CM portion) is measured by using the control pulses.

The subsequent CM portions, too, are skipped in the same way. The CM portion and the program portion are distinguished from each other by the method described above, and only the CM is skipped. A CM skip on/off switch 23 determines whether or not the CM skip is made on the basis of the user's judgement. When this switch is on, the ON signal is supplied to the microcomputer 13, and the microcomputer 13 sends the command to the tape driving circuit 15 so as to execute the CM skip described above. When this switch 23 is off, the OFF signal is supplied to the microcomputer 13, and the microcomputer 13 does not execute the CM skip. Therefore, the commercial message portion, too, is reproduced in the same way as the program content portion.

A broadcasting mode judgement device 24 is the CM judgement means by the broadcasting mode judgement that has been described with reference to the prior art technologies. This judgement device 24 discriminates the commercial message portion from other bilingual broadcasting programs and monaural broadcasting programs provided that the commercial message portion is broadcasted by stereophonic broadcasting. This broadcasting mode judgement device 24 only judges the commercial message portion, and recording is not omitted on the basis of the signal of this broadcasting mode judgement device 24. The CM judgement can be made with a higher level of accuracy by judging the signal of the broadcasting mode judgement device 24 by the audio signal no level detector 11 in combination with the video signal detector 18.

Next, the CM judgement method will be explained with reference to FIG. 2.

Figure 2:
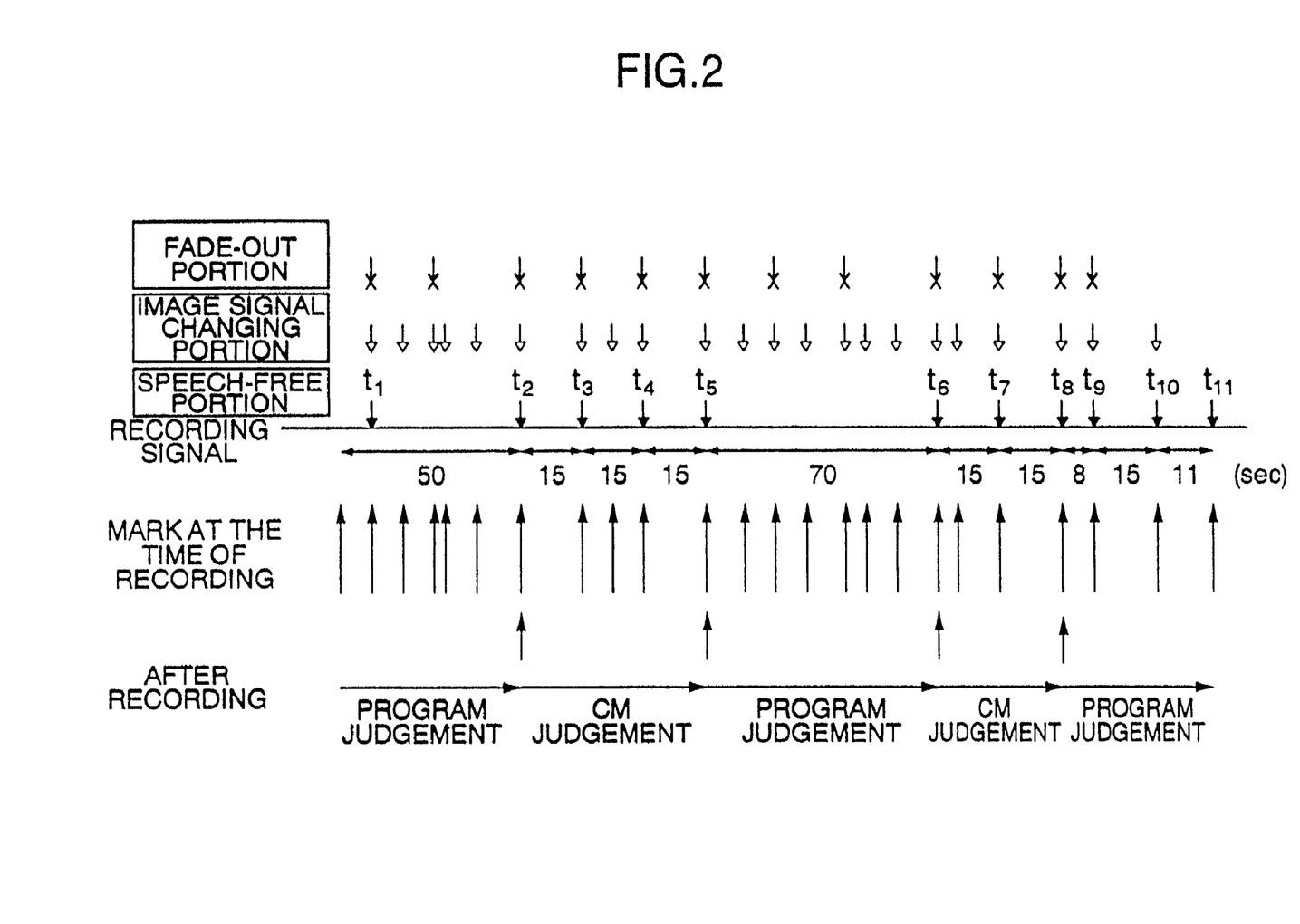
FIG. 2 is an explanatory view useful for explaining a CM judgement method according to one embodiment of the present invention.

In FIG. 2, a thick solid line of "recording signal" represents the time axis. The audio signal no level detector 11 detects the portion (audio-free portion) at which the sound level becomes zero at the time represented by a downward arrow put on this recording signal, and it is inputted to the microcomputer 13. In this diagram, the audio-free portion is detected at the timings $t_1$, $t_2$, $t_3$, $t_4$, $t_5$, $t_6$, $t_7$, $t_8$, $t_9$, $t_{10}$ and $t_{11}$, and the microcomputer 13 measures the time intervals between them.

The CM is prepared and inserted in a predetermined interval (15 seconds or some multiples of 15 seconds such as 15 sec, 30 sec and 60 sec) and the audio-free portions exist before and behind the CM. The interval between the audio-free portions is judged as the CM portion by utilizing the nature of the CM described above. Quite naturally, the audio-free portions exist in the program portion, too, but the interval between them is not constant unless specifically intended. Therefore, when the interval between the audio-free portions is greater or smaller than a predetermined interval, such portions are judged as the program. The audio-free portions are measured inside the microcomputer 13 while the program is recorded to the magnetic tape 1, and are sequentially stored and marked from the microcomputer 13 into the CM information memory circuit 12. Furthermore, after recording is completed, the interval portions are again edited so as to distinguish the program portions from the CM portions, and are then stored in the CM information memory circuit 12.

Correctly speaking, the time interval of the audio-free portion is not 15 seconds. For, the time of the audio-free portion itself is generally greater than 50 ms. Though this time is different from the CM to the CM, it is at least 200 ms at the shortest. When the time interval of the audio-free portion is between 14.5 seconds to 15.0 seconds, between 29.5 second and 30.0 seconds and between 59.5 seconds and 60.0 seconds, such audio-free portions are judged as the CM portion. When this time interval is expanded, judgement of the CM portion can be made even when the time interval of the CM portion is small but in such a case, there develops the possibility that the original program content portion is erroneously judged as the CM portion.

Here, measurement of the time intervals by the microcomputer 13 is effected in the following way, for example: $(t_2-t_1)=50$ sec, $(t_3-t_1)=65$ sec, $(t_3-t_2)=15$ sec, $(t_4-t_2)=30$ sec, $(t_4-t_3)=15$ sec, $(t_5-t_2)=45$ sec, $(t_5-t_3)=30$ sec, $(t_5-t_4)=15$ sec, $(t_6-t_2)=115$ sec, $(t_6-t_3)=100$ sec, $(t_6-t_4)=85$ sec, $(t_6-t_5)=70$ sec, $(t_7-t_6)=15$ sec, $(t_8-t_6)=30$ sec, $(t_8-t_7)=15$ sec, $(t_9-t_6)$=38 sec, $(t_9-t_7)$=23 sec, $(t_9-t_8)$=8 sec, $(t_{10}-t_6)$=53 sec, $(t_{10}-t_7)$=38 sec, $(t_{10}-t_8)$=23 sec, $(t_{10}-t_9)$=15 sec, $(t_{11}-t_6)$=64 sec, $(t_{11}-t_7)$=49 sec, $(t_{11}-t_8)$=34 sec, $(t_{11}-t_9)$=26 sec, $(t_{11}-t_{10})$=11 sec.

In other words, not only the time interval between the adjacent audio-free portions but also the time interval between a given audio-free portion and the second next audio-free portion are measured. For, because the audio-free portions are sometimes contained in the commercial message portion having a time length of 15 seconds or its multiples, the commercial message portion cannot be judged by the time interval of only the adjacent audio-free portions. Therefore, the time intervals between the time $t_1$ and the time $t_2$ and between the time $t_1$ and the time $t_2$ are measured for the audio-free portion at the time $t_1$. When the time interval between a given audio-free portion and another exceeds 60 seconds, on the other hand, measurement of the time difference exceeding this time interval becomes meaning-less because the commercial message portion exceeding 60 seconds does not exist. Therefore, the subsequent measurement of the time interval is not effected. In other words, when the time difference between the time $t_1$ and the time $t_3$ is measured for the audio-free portion at the time $t_1$, the measurement of the subsequent time difference is no longer made.

In FIG. 2, downward arrows put on the audio-free portion represent the video signal changing portions. In other words, the time interval between the points at which the signal level obtained by averaging the signal levels on the screen drastically changes (the switching points of the scenes) is measured in the same way as the measurement of the time intervals in the audio-free portions. As is obvious from FIG. 2, the time interval of the image signal changing portions is shorter than the time interval of the audio-free portion. The video signal changing portion is measured inside the microcomputer 13 while the program is recorded on the magnetic tape 1, and the interval portions are again edited either sequentially or after recording is completed so as to distinguish the program portions from the CM portions. The microcomputer 13 can correctly judge the commercial message portion by calculating the AND condition between the audio-free portion and the video signal changing portion.

The points at which the composite signal, the luminance signal, etc, fade out and change to the black level or the white level can be used as the changing points of the video signal, and the arrows put on the video signal changing portion in FIG. 2 represent the fade-out portions.

In the broadcasting signals in Japan, the audio-free portions are generally provided before and behind the commercial message portion but in the broadcasting signals in the United States, the fade-out portions are generally provided before and behind the commercial message portion. Therefore, it is more effective to use the method which utilizes the fade-out portions for the recording apparatuses used in the United States.

Further, the audio-free portion appearing between the time $t_9$ and the time $t_{10}$ has the time interval of 15 seconds and cannot be judged by using the audio signal no level detector 11 and the video signal detector 18 described already. However, a commercial message portion having the time of 15 seconds seldom appears alone but two or four commercial message portions consecutively appear. Therefore, when the audio-free portion having the time length of 15 seconds is detected, whether it is the message portion or the program content portion is judged by detecting whether or not the audio-free portions of 15 seconds exist before and behind this commercial message portion. When the audio-free portion appearing from the time $t_9$ and the time $t_{10}$ is considered, the audio-free portion before it has the time of 8 seconds and the audio-free portion continuing it has the time of 11 seconds. Therefore, this audio-free portion is judged as the program content portion.

When a logical OR is calculated between the signal of the fade-out portion and the signal of the audio-free portion, the audio-free portion appearing from the time $t_9$ to the time $t_{10}$ can be judged as the program content portion, too.

Judgement of the CM portion can be also made by using conjointly the mode judgement device 24 besides the methods described above.

The system for detecting the video signal changing portion can execute the judgement of a higher level of accuracy because it can judge not only the switching of the scenes but also fade-out.

On the other hand, the system for detecting the video signal changing portion needs a greater data quantity and the load to the microcomputer 13 becomes greater, too. To mitigate the load to the microcomputer 13, therefore, the system for detecting the fade-out portion is more preferred. This fade-out system is particularly effective in the United States.

This embodiment can distinguish the commercial message portion from the program content portion by measuring the interval of the peculiar points of the audio signals and the video signals during recording of the program and can skip the CM portion by the information of the CM portion obtained by computation at the time of recording while the program is reproduced.

Because the CM information is stored in the memory circuit inside the apparatus main body, skip reproduction can be easily carried out by checking the content of this memory circuit.

Because this embodiment detects the audio-free portion of the audio signals and judges the commercial message portion, it can judge relatively easily the CM portion.

Because the embodiment judges the commercial message portion from the video signals, too, it can more correctly judge the CM portion.

Because the embodiment utilizes the changing portion of the video signal when judging the commercial message portion from the video signal, it can judge the commercial message portion with a higher level of accuracy.

Because the embodiment utilizes the fade-out portion of the video signal when judging the commercial message portion from the video signal, it can simplify much more the processing than when the changing portion of the video signal is used.

The embodiment can further improve accuracy by conducting the judgement by using the broadcasting mode in combination.

Next, another embodiment of the present invention will be explained with reference to FIG. 3.

Figure 3:
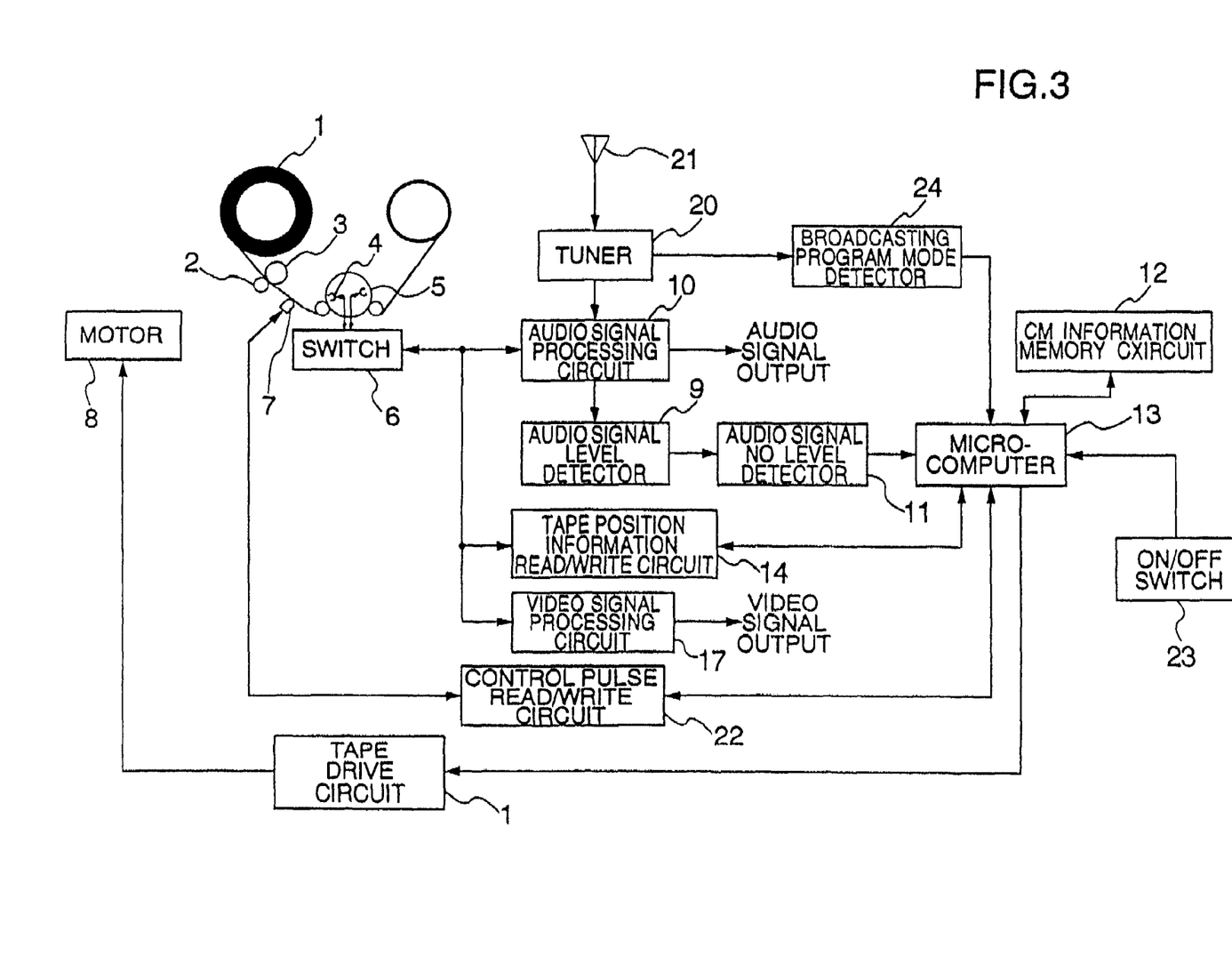
FIG. 3 is a block diagram of a video recording/reproducing apparatus according to another embodiment of the present invention.

FIG. 3 is a block diagram of a video recording/reproduction apparatus according to another embodiment of the present invention, wherein like reference numerals are used to identify like constituent members as in FIG. 1.

The difference of this embodiment from the first embodiment resides in that CM judgement means not using the video signals but using the audio signal and the broadcasting mode is employed.

First, the explanation will be given on the case where television broadcasting containing the CMs is recorded by loading the magnetic tape.

The radio wave of the television broadcasting is inputted to the antenna 21 and is supplied to the tuner 20. The tuner 20 selects a desired program. The program selected by the tuner 20 is outputted as the audio signals by the audio signal processing circuit 10. The program is also outputted as the video signals by the video signal processing circuit 17. When these audio signals and video signals are recorded on the magnetic tape 1, they are supplied to the switch 6 and are recorded by the magnetic head 4 on the magnetic tape 1. The tape position information read/write circuit 14 records the time codes, etc, as the position information of the tape, with the recognition number of the tape, on the magnetic tape 1 through the magnetic head 4 simultaneously with the start of recording. This information is encoded and written into the blanking portion of the video signals, for example.

On the other hand, the signals outputted as the audio signals in the audio signal processing circuit 10 are supplied to the audio signal level detector 9. The audio signal level detector 9 detects the magnitude of the audio signals and supplies the magnitude of the level to the audio signal no level detector 11. The audio signal no level detector 11 detects the point at which the audio signal level close to zero and supplies it detection signal to the microcomputer 13.

The microcomputer 13 stores the time of the detection signal of this time supplied from the audio signal no level detector 11 and the tape position information supplied from the tape position information read/write circuit 14, measures the time interval of the detection signal from the time of the next detection signal, and judges the signal when the interval is a constant interval. The tape position information supplied from the tape position information read/write circuit 22 simultaneously with the output of the detection signal by the audio signal is also stored in the microcomputer 13.

When the signals are judged as the CM by the audio signals, the tape position information and the tape recognition numbers at the start and end of the CM are supplied to the CM information memory circuit 12. The CM information memory circuit 12 stores the tape recognition number and the tape position information as the CM information. The CM information memory circuit 12 for storing this CM information may comprise a semiconductor memory such as an EEPROM or a RAM or a magnetic tape. In other words, the CM position information are sequentially stored in the CM information memory circuit 12 during the recording mode while the program is recorded.

The program so recorded is reproduced in the following way. First, the tape position information and the tape recognition number written into the magnetic tape 1 are read out by the tape position information read/write circuit 14. The tape position information and the tape recognition number so read out are supplied to the microcomputer 13. The microcomputer 13 looks up the CM position information of the tape during reproduction, which is stored in the CM information memory circuit 12, from the tape recognition number.

The microcomputer 13 distinguishes the CM portion from the program portion from the tape position information during reproduction on the basis of the CM position information looked up from the CM information memory circuit 12, and gives the fast-forward command or the fast-play command to the tape drive circuit 15 so as to skip the CM portion when the CM portion is reached. The tape drive circuit 15 drives the motor 8 in accordance with this command and causes the magnetic tape 1 to travel at a high speed.

The microcomputer 13 counts the number of control pulses existing from the start position of the CM to its end position from the CM information, and counts the control pulses supplied thereto from the control pulse read/write circuit 22 from the CM start position. When the number of the control pulses so counted reaches the number of the control pulses existing in the CM portion, the microcomputer 13 gives a command to the tape drive circuit 15 so as to stop fast-forward or fast-play and to return to standard reproduction, and the tape drive circuit 15 drives the motor 8 and lets the magnetic tape travel at the standard travelling speed. The subsequent CM portions are skipped in the same way. As described above, the CM portion and the program portion are distinguished from each other, and only the CM is skipped.

This embodiment can distinguish the commercial message portion from the program content portion by measuring the intervals of the peculiar points of the audio signals during recording of the program, and can skip the CM portion during reproduction of the program from the information of the CM portion obtained by calculation at the time of recording.

In comparison with the first embodiment shown in FIG. 1, the number of the factors for judging the CM becomes smaller, but the circuit scale can be made smaller, as well. Further, the capacity of the memory for storing the information of the peculiar points at the time of the judgement of the CM can be reduced.

Because the CM information is stored in the memory circuit inside the apparatus main body, skip reproduction can be easily carried out by checking the content of this memory circuit.

Because the audio-free portion of the audio signal is detected so as to judge the commercial message portion, the CM portion can be judged relatively easily.

Judgement accuracy can be further improved by using the judgement by the broadcasting mode in combination.

Next, still another embodiment of the present invention will be explained with reference to FIG. 4.

Figure 4:
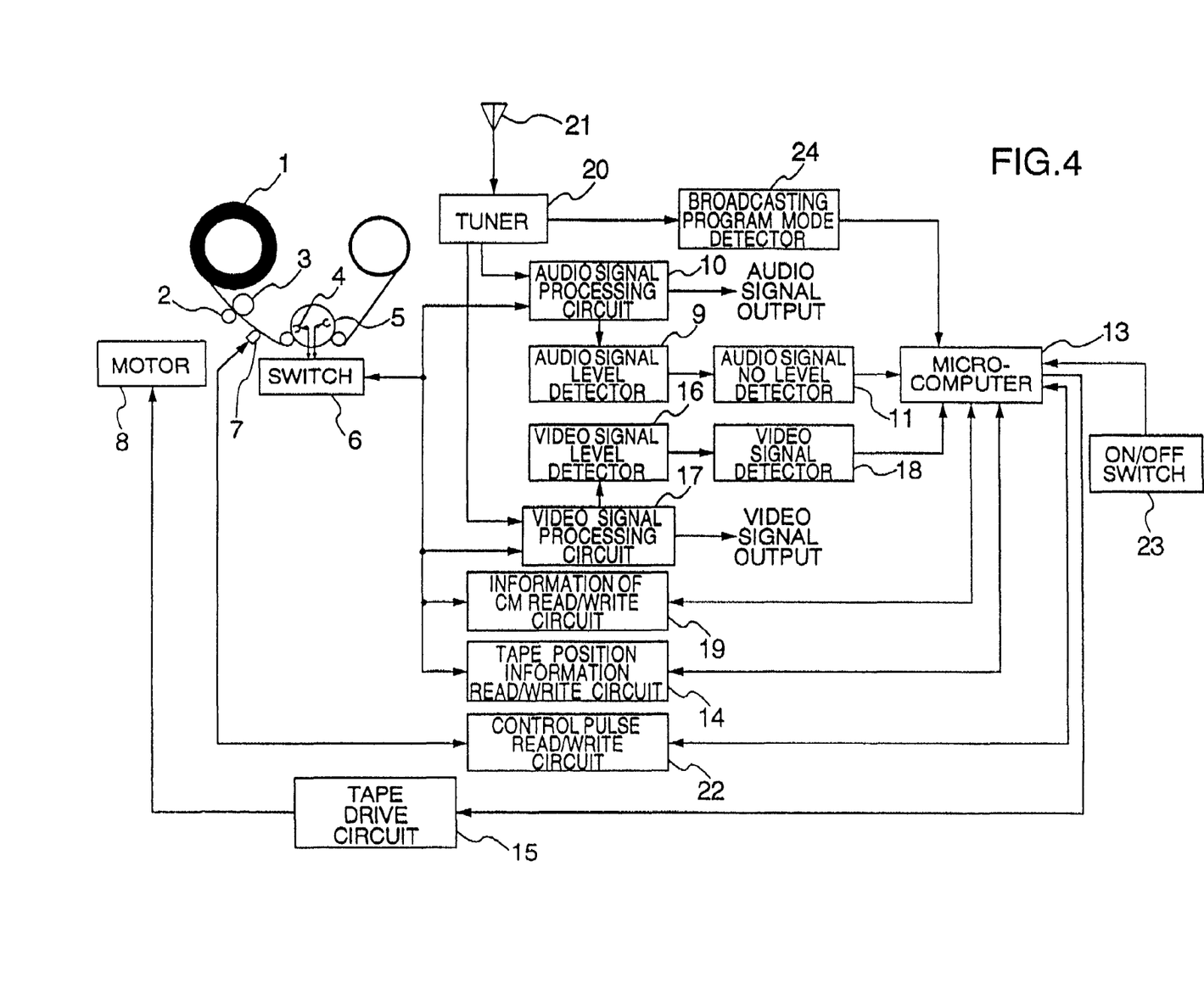
FIG. 4 is a block diagram of a video recording/reproducing apparatus according to still another embodiment of the present invention.

FIG. 4 is a block diagram useful for explaining still another embodiment of the present invention, wherein like reference numerals are used to identify like constituent members as in FIG. 1.

The difference of this embodiment shown in FIG. 4 from the first embodiment shown in FIG. 1 resides in that the circuit 12 for storing the CM information is not particularly disposed and the CM information is directly written to the magnetic tape 1 to which the program is recorded.

During recording of the program, the microcomputer 13 judges the CM from the audio signals and the video signals in the same way as in the first embodiment. After recording is completed, the microcomputer 13 gives a command to the tape drive circuit 15 to rewind the tape, so as to record the CM position information so judged to the magnetic tape 1. The tape drive circuit 15 drives the motor 8 and causes the magnetic tape 1 to be rewound and the CM information read/write circuit 19 records the CM information. To reproduce the tape, the CM position information of the magnetic tape 1 is first read out by the CM information read/write circuit 19 and this information is stored in the microcomputer 13. When the CM portion is identified from the correspondence to the tape position information read out by the tape position information read/write circuit 14 from the tape 1 while the program is reproduced, this CM portion is skipped by fast-forward, etc.

The position at which the CM information is recorded will be explained with reference to FIG. 5.

Figure 5:
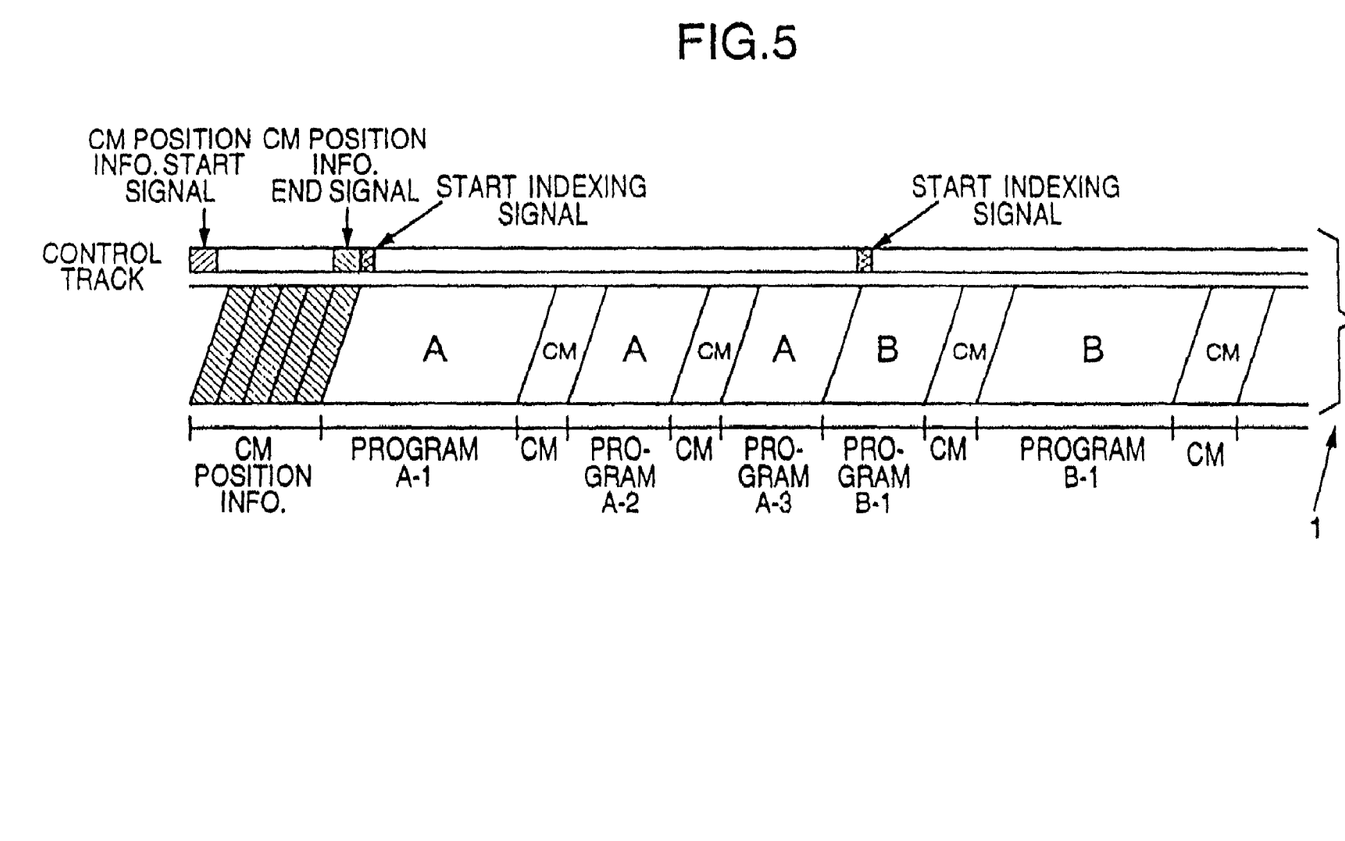
FIG. 5 is a schematic view of a magnetic tape in a transverse direction according to still another embodiment of the present invention.

FIG. 5 is a schematic view of the magnetic tape 1 in the longitudinal direction in the embodiment of the invention shown in FIG. 4, and shows the control track portion and the portion at which the video signal is recorded.

In the example shown in FIG. 5, the portion for storing the CM information is provided to the winding start portion of the magnetic tape 1 and all the CM information of the programs are stored in this portion. In this example, the information of the program A and the program B are recorded in the leading portion (hatched portion). The CM position information start signal is recorded in the control track at the leading portion of the magnetic tape 1, and the CM position information is so recorded in the main body recording portion of the magnetic tape 1 as to continue this CM position information start signal. The start indexing signal is recorded in the leading control track of each of the programs A and B.

The recording contents of the CM position information contain the programs A and B and the information on the CM portion interposed between the programs. In other words, as to the program A, the recording content includes the information on the time length of the program A-1, the information of the time length of the CM continuing the program A-1, the information of the time length of the program A-2, the information of the time length of the CM continuing the program A-2, and the information of the time length of the program A-3. Further, the recording content includes the information of the program B continuing the program A, that is, the information of the time length of the program B-1, the information of the time length of the CM continuing the program B-1, the information of the time length of the program B-2 and the information of the time length of the CM continuing the program B-2, and all of them are collectively recorded.

Reproduction is carried out in the following way. The magnetic tape 1 is once rewound to the leading position and the CM position information start signal is detected. Thereafter, all the CM position information of the magnetic tape 1 are read out by the CM information read/write circuit 19 by normal reproduction, and these information are stored in the microcomputer 13. Thereafter, the CM information stored during reproduction are allowed to correspond to the tape position information read out by the tape position information read/write circuit 14 from the magnetic tape 1 to detect the CM portion, and when this CM portion is reached, only the CM portion is skipped by fast-forward, etc.

This embodiment can grasp the CM information of all the programs once the leading CM information is read out.

Because the CM information is recorded to the leading portion of the tape, all the CM information can be written again at the time of overwrite, too.

Figure 6:
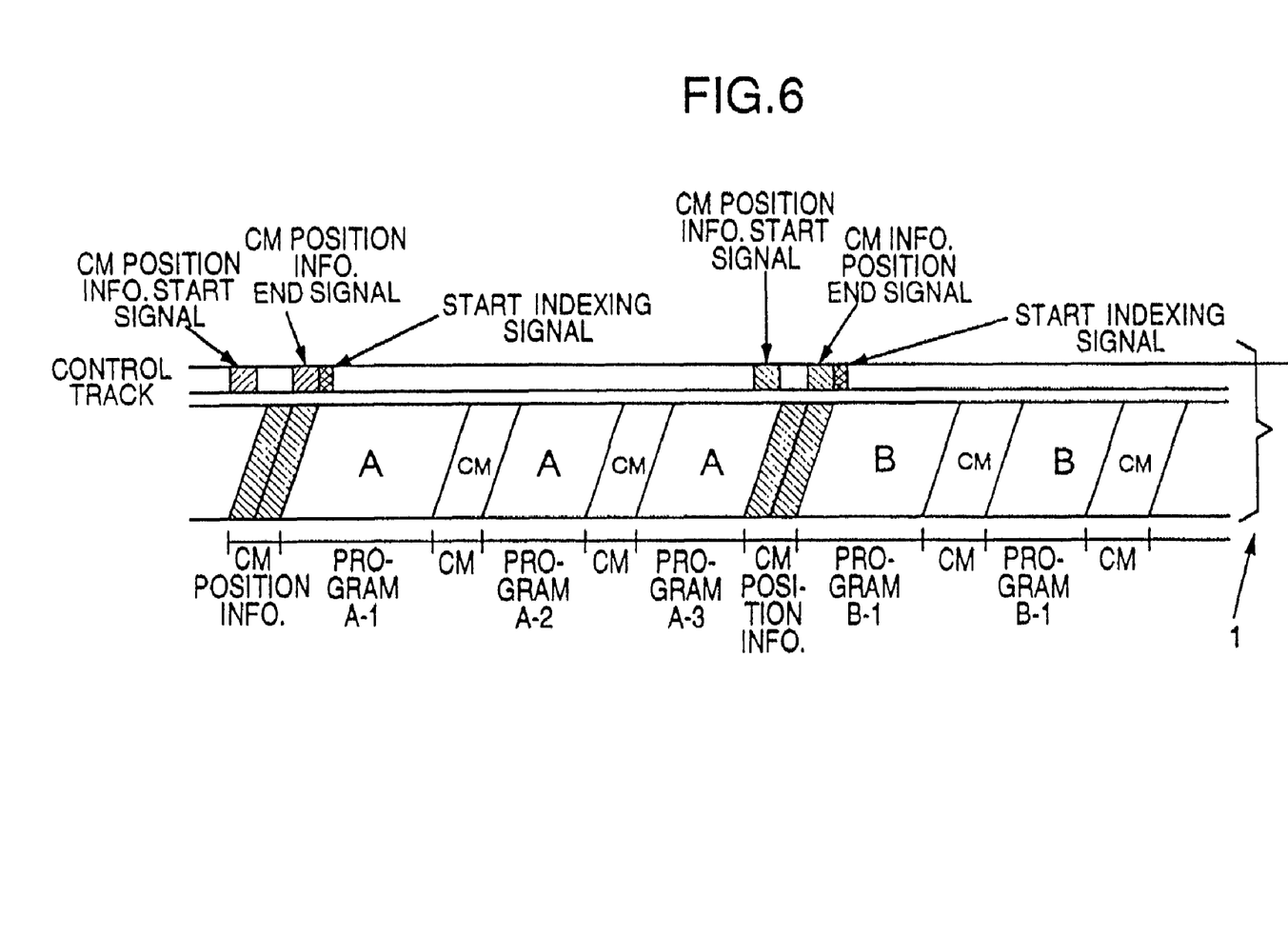
FIG. 6 is a schematic view of a magnetic tape in a transverse direction according to still another embodiment of the present invention.

FIG. 6 is a schematic view of the magnetic tape 1 in the longitudinal direction in the embodiment of the invention shown in FIG. 4, and shows the control track portion and the portion to which the video signal is recorded.

In the example shown in FIG. 6, the CM information is recorded at the leading portion of each of the recorded programs. In this case, the information of the program A and that of the program B are recorded at the leading portions (hatched portions) of the programs A and B, respectively. The CM position information start signal is recorded at the leading portion of each program of the control track of the magnetic tape 1, and the CM position information is so recorded at the main body recording portion of the magnetic tape 1 as to continue this CM position information start signal. The start indexing signal is recorded in the leading control track of each of the programs A and B.

The recorded content of the CM position information described above includes the information on the distinction between the program A and the program B and the information on the CM portion interposed within one program as shown in FIG. 6. In other words, as to the program A, the recorded content includes the information of the time length of the program A-1, the information of the time length of the CM continuing the program A-1, the information of the time length of the program A-2, the information of the time length of the CM continuing the program A-2 and the information of the time length of the program A-3. As to the program B, the recorded content includes the information of the time length of the program B-1, the information of the time length of the CM continuing the program B-1, the information of the time length of the program B-2 and the information of the time length of the CM continuing the program B-2.

Reproduction is carried out in the following way. First, the magnetic tape 1 is rewound to the leading position of each program and the CM position information start signal is detected. Next, the CM position information of the magnetic tape 1 is read out by the CM information read/write circuit 19 by normal reproduction, and this information is stored in the microcomputer 13. Correspondence is then established between the information so stored and the tape position information read out from the magnetic tape 1 by the tape position information read/write circuit 14 during the reproduction of the program, and only the CM portion is skipped by fast-forward, etc, when this CM portion is reached.

According to this embodiment, the tape needs be rewound only to the leading portion of each program. Therefore, the rewinding quantity becomes smaller than in the foregoing embodiments and the operation factor becomes higher.

In this case, the rewinding quantity to the tape after completion of recording becomes minimum. However, there is the possibility that the CM information might disappear if overwrite is effected.

In the example shown in FIG. 5, on the other hand, all the CM information can be rewritten at the time of overwrite because the CM information is recorded to the leading portion of the tape.

Figure 7:
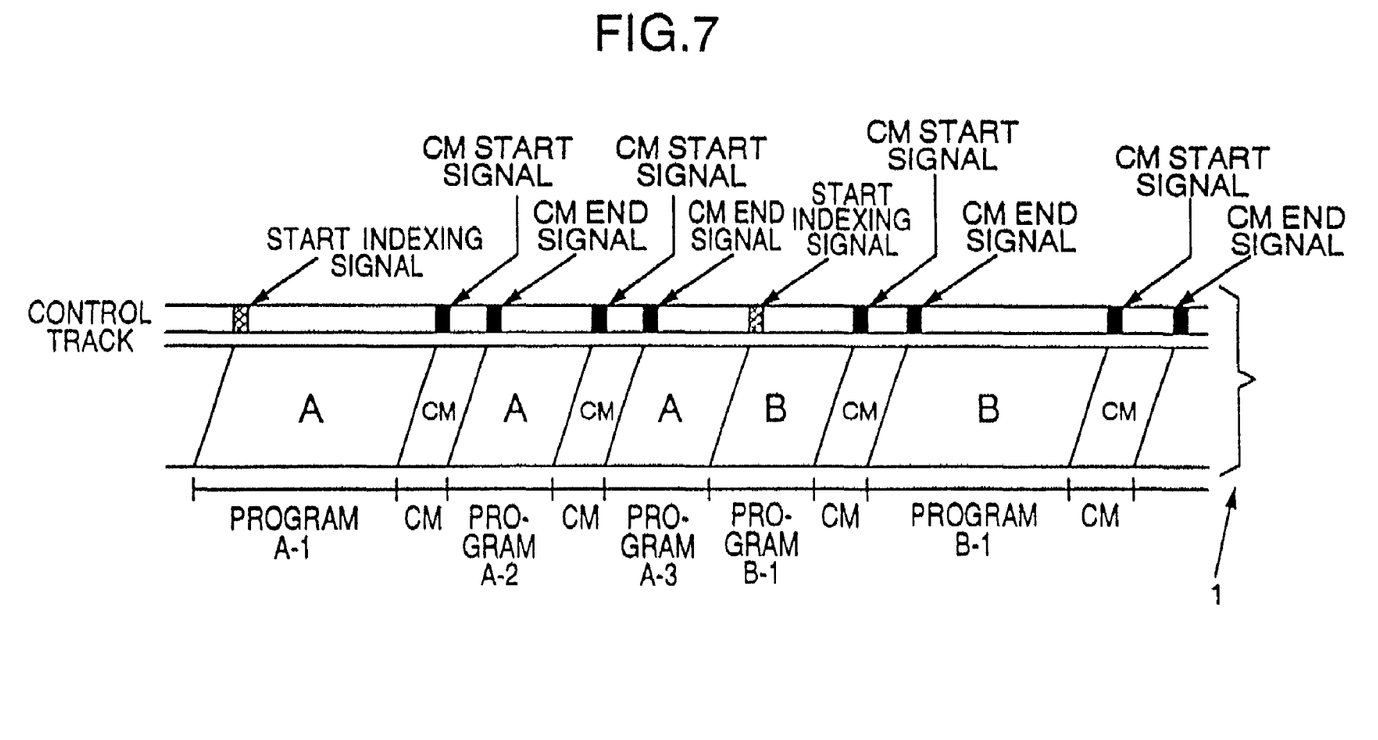
FIG. 7 is a schematic view of a magnetic tape in a transverse direction according to still another embodiment of the present invention.

FIG. 7 is a schematic view of the magnetic tape 1 in the longitudinal direction according to the embodiment of the invention shown in FIG. 4, and shows the control track portion and the portion to which the video signal is recorded.

In the example shown in FIG. 7, the CM start signal and the CM end signal are recorded as the CM information signals on the control tracks before and behind each recorded program. The start indexing signal is recorded on the leading control track of each of the programs A and B. It will be hereby assumed that the recording content of the CM position information represents the start position of the CM and its end position.

Reproduction is carried out in the following way. The CM position information of the magnetic tape 1 is read out by the CM information read/write circuit 19 while the magnetic tape 1 is normally reproduced. When the CM portion is detected from the correspondence relationship between the CM position information and the tape position information read out by the tape position information read/write circuit 14 from the magnetic tape 1 while the program is reproduced, only the CM portion is skipped by fast-forward, etc.

In this case, since the start signal of the CM and its end signal cannot be recorded during recording of the program, the microcomputer 13 sends the command to the tape drive circuit 15 to drive the motor 8 and to rewind the tape to the CM position on the basis of the CM position information judged during recording so that the start signal and the end signal can be recorded to the start position and the end position, respectively, after recording of the program is completed. During reproduction, the CM portion is fastforwarded by reading out this CM start signal, and the operation mode is returned to the standard reproduction at the stage where the CM end signal is read out. Accordingly, the tape need not be rewound to read out the CM information till the start.

According to this embodiment, the CM portion can be automatically skipped by normal reproduction without the necessity for rewinding the magnetic tape, and the operation factor becomes high.

According to the embodiment shown in FIG. 4, the commercial message portion and the program content portion can be distinguished by measuring the intervals of the peculiar points of the audio signals and the video signals during recording of the program. Furthermore, the CM portion can be skipped during reproduction of the program from the information of the CM portion that is obtained by computation during recording.

As already described with reference to FIGS. 1 and 3, the system using the CM information memory circuit can be applied only to the reproduction operation of the magnetic tape recorded by this system by the apparatus used for recording the tape. According to the embodiment shown in FIG. 4, on the other hand, only the CM portion can be suitably skipped by fast-play, etc, by reading the information of the leading position even when the magnetic tape having the CM information recorded thereto is reproduced by other apparatuses.

When the audio-free portion of the audio signal is detected as described with reference to FIG. 3, the commercial message portion can be judged. Therefore, the CM portion can be judged relatively easily.

The commercial message portion can be judged more accurately by judging the commercial message portion from the video signals, too, as described already with reference to FIGS. 1 and 4.

When the commercial message portion is judged from the video signal, the commercial message portion can be judged with higher accuracy by using the changing portions of the video signals.

When the commercial message portion is judged from the video signal, further, the judgement process can be simplified by using the fade-out portions of the video signals in comparison with the case where the changing portions of the video signals are used.

Accuracy of judgement can be further improved by using conjointly the judgement by the broadcasting mode as already described with reference to FIGS. 1, 2 and 4.

Next, still another embodiment of the present invention will be explained with reference to FIG. 8.

Figure 8:
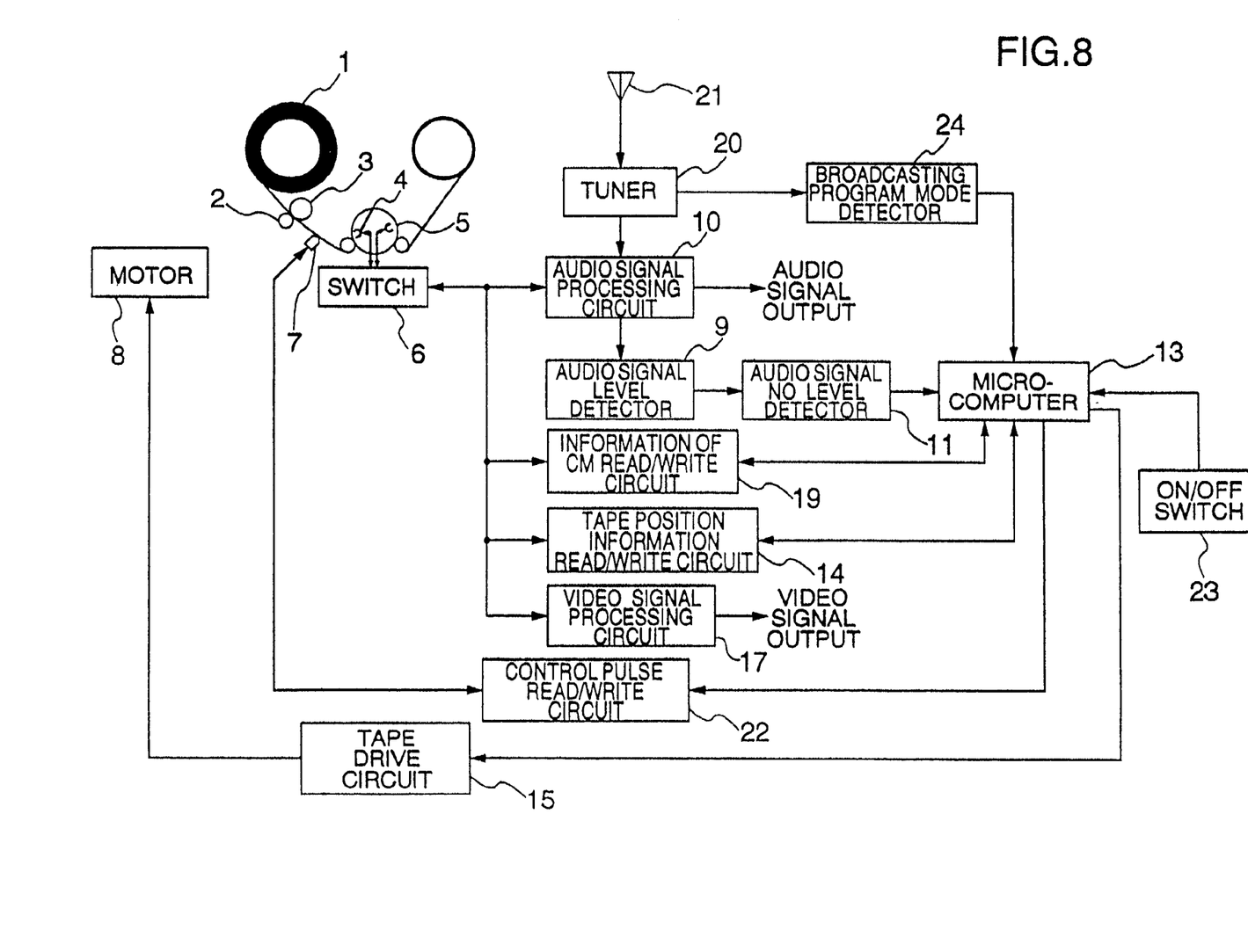
FIG. 8 is a block diagram of a video recording/reproducing apparatus according to still another embodiment of the present invention.

FIG. 8 is a block diagram useful for explaining still another embodiment of the present invention, wherein like reference numerals are used to identify like constituent members as in the embodiment shown in FIG. 3.

The difference of this embodiment from the embodiment shown in FIG. 3 is that the CM information is written to the magnetic tape, etc, to which the program is recorded, without disposing the circuit for storing the CM information.

Judgement of the CM is made by the microcomputer 13 from the audio signals at the time of recording of the program in the same way as in the second embodiment described already. To record the position information of the CM so judged after recording is completed, the microcomputer 13 gives the command to the tape driving circuit 15 so as to rewind the magnetic tape 1, and the tape driving circuit 15 drives the motor 8 to rewind the magnetic tape 1, so that the CM information read/write circuit 19 records the CM information.

When reproduction is made, the CM position information of the magnetic tape 1 is read out by the CM information read/write circuit 19 and this information is stored in the microcomputer 13. While the program is reproduced, this information is allowed to correspond to the tape position information read out from the magnetic tape 1 by the tape position information read/write circuit 14. When the CM portion is reached, only the CM portion is skipped by fast-forward, etc. The write position of the CM information is the leading position of the magnetic tape or the leading portion of the program as described above, or the start signal of the CM and its end signal are recorded to the control tracks without writing the position information.

According to this embodiment, the commercial message portion and the program content portion can be distinguished by measuring the intervals of the peculiar points of the speech signals during recording of the program, and only the CM portion can be skipped during reproduction of the program from the information of the CM portion obtained by computation at the time of recording.

The CM position information judged in this way is recorded not to the external device but to the magnetic tape itself. Therefore, only the CM portion can be skipped similarly in the magnetic recording/reproduction apparatuses having this function.

Since the commercial message portion is judged by detecting the audio-free portions of the audio signals, the CM portion can be judged relatively easily.

When judgement by the broadcasting mode is used in combination, accuracy can be further improved.

According to the present invention, the commercial message portion can be distinguished even when the broadcasting mode is the same.

The invention claimed is:

1. An apparatus for recording/reproducing program material including audio and video signals, comprising:
    a recording/reproducing device which records audio and video signals in a recording medium, and reproduces audio and video signals from a recording medium; and
    a controller which controls said recording/reproducing device to skip over a recorded portion of said medium in which time intervals between changing points of said audio or video signals correspond to a predetermined time interval and occur at least two times consecutively, and to reproduce a recorded portion of said medium at a standard reproduction speed wherein only a single time interval between changing points corresponds to a predetermined time interval.

2. The apparatus according to claim 1, wherein said changing points are points at which the video signal level changes to a black or white level.

3. The apparatus according to claim 1, wherein said changing points are points at which the audio signal level is lower than a predetermined level.

4. The apparatus according to claim 1, wherein said changing points are points at which the audio signal level is approximately zero.

5. The apparatus according to claim 1, wherein said changing points are points at which the audio signal level is approximately zero and the video signal level changes to a black or white level.

6. A method of reproducing audio and video signals, comprising:
    reproducing at a standard reproduction speed a portion of said medium where a time interval between changing points of said audio and video signals corresponds to a predetermined time interval, and occurs alone; and skipping over at a high reproduction speed a portion of said medium where time intervals between said changing points correspond to a predetermined time interval, and occur at least two times consecutively.

7. The apparatus according to claim 6, wherein said changing points are points at which the audio signal level is lower than a predetermined level and the video signal level changes to a black or white level.

8. An apparatus for recording/reproducing audio and video signals, said apparatus comprising:
   a receiver which receives said audio and video signals;
   a recording/reproducing device which records received audio and video signals in a recording medium, and reproduces said audio and video signals from the recording medium; and
   a controller which, during reproduction of said audio and video signals from the recording medium, controls said recording/reproducing device to skip over portions of said medium wherein a time interval between one pair of changing points of said audio and video signals or a sum of adjacent time intervals between two or more pairs of the changing points corresponds to a predetermined time interval, and the predetermined time intervals occur at least two times consecutively.

9. The apparatus according to claim 8, wherein said changing points are points at which the audio signal level is lower than a predetermined level and the video signal level changes to a black or white level.

10. An apparatus for recording/reproducing program material including commercial message portions on a tape, comprising:
    a recording/reproducing device which records said program material and tape position information indicative of a tape position on oblique tracks of the tape, and reproduces said program material and said tape position information from said oblique tracks;
    a control pulse read/write device which writes pulse signals at a constant interval on a control track of the tape, and reads said pulse signals from said control track;
    a detector which detects said commercial message portions;
    a memory which stores commercial position information indicative of a position of the commercial message portions on the tape; and
    a controller which controls said recording/reproducing device to start a skip reproduction of commercial message portions at a tape speed which is higher than a normal reproduction speed, based on said commercial position information read out from said memory and said tape position information reproduced from said oblique tracks, and to stop said skip in accordance with a number of pulse signals read out from said control track.

11. The apparatus according to claim 10, wherein said recording/reproducing device records a tape identification information which identifies the tape on said oblique tracks, and said memory stores said tape identification information with said commercial position information.

12. The apparatus according to claim 10, wherein said detector identifies portions of said program material as commercial message portions, wherein time intervals between changing points of said program material correspond to a predetermined time interval and occur at least twice consecutively.

13. The apparatus according to claim 12, wherein said changing points are fade-out portions of said program material.

14. The apparatus according to claim 12, wherein said changing points are points at which the audio signal level of said program material is approximately zero.

15. The apparatus according to claim 12, wherein said changing points are points at which the video signal level of said program material changes to a black or white level.

* * * * *